US012573734B2

(12) United States Patent
Yoshikawa

(10) Patent No.: US 12,573,734 B2
(45) Date of Patent: Mar. 10, 2026

(54) COMPOSITE RESONATOR AND ASSEMBLY

(71) Applicant: KYOCERA CORPORATION, Kyoto (JP)

(72) Inventor: Hiromichi Yoshikawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 215 days.

(21) Appl. No.: 18/555,863

(22) PCT Filed: Dec. 17, 2021

(86) PCT No.: PCT/JP2021/046887
§ 371 (c)(1),
(2) Date: Oct. 18, 2023

(87) PCT Pub. No.: WO2022/224493
PCT Pub. Date: Oct. 27, 2022

(65) Prior Publication Data
US 2024/0213640 A1 Jun. 27, 2024

(30) Foreign Application Priority Data
Apr. 19, 2021 (JP) ................................. 2021-070368

(51) Int. Cl.
*H01P 1/20* (2006.01)
*H01P 1/201* (2006.01)
*H01Q 15/02* (2006.01)

(52) U.S. Cl.
CPC ............. *H01P 1/201* (2013.01); *H01Q 15/02* (2013.01)

(58) Field of Classification Search
CPC .... H01Q 15/02; H01Q 21/065; H01Q 9/0414; H01P 1/201
See application file for complete search history.

(56) References Cited

U.S. PATENT DOCUMENTS 5,084,647 A * 1/1992 Inoue ..................... H03H 9/178 310/366
6,426,722 B1 7/2002 Sievenpiper et al.
6,483,481 B1 * 11/2002 Sievenpiper ......... H01Q 15/008 343/909
(Continued)

FOREIGN PATENT DOCUMENTS

JP 2003526978 A 9/2003
JP 2015231182 A 12/2015
(Continued)

OTHER PUBLICATIONS

Kaouach, H. et al., "Design and Characterization of Wideband High-Efficiency Unit Cells for Frequency Selective Surfaces in 10GHz-Band," 2015 International Conference on Electromagnetics in Advanced Applications (ICEAA), IEEE, Sep. 7, 2015, 4 pp.
(Continued)

*Primary Examiner* — Quan Tra
(74) *Attorney, Agent, or Firm* — HAUPTMAN HAM, LLP

(57) ABSTRACT

A composite resonator includes a first resonator extending in a first plane direction, a second resonator spaced apart from the first resonator in a first direction and extending in the first plane direction, a third resonator located between the first resonator and the second resonator in the first direction and configured to be magnetically or capacitively connected to or electrically connected to each of the first resonator and the second resonator, and a reference conductor extending in the first plane direction, located between the first resonator and the second resonator in the first direction and serving as a potential reference of the first resonator and the second resonator.

15 Claims, 10 Drawing Sheets

(56) References Cited

U.S. PATENT DOCUMENTS

| | | | | |
|---|---|---|---|---|
| 7,460,072 | B1 * | 12/2008 | Goldberger | H01Q 1/38<br>343/700 MS |
| 10,826,188 | B2 | 11/2020 | Kristou et al. | |
| 2007/0279143 | A1 * | 12/2007 | Itsuji | H03B 7/08<br>331/185 |
| 2008/0266018 | A1 | 10/2008 | Han et al. | |
| 2009/0071709 | A1 | 3/2009 | Han et al. | |
| 2012/0032760 | A1 * | 2/2012 | Wurth | H01P 1/20327<br>333/204 |
| 2018/0301807 | A1 | 10/2018 | Clemente et al. | |
| 2019/0044244 | A1 | 2/2019 | Kristou et al. | |
| 2019/0165475 | A1 | 5/2019 | Shibata | |
| 2020/0145038 | A1 * | 5/2020 | Onaka | H03F 3/19 |
| 2020/0168996 | A1 * | 5/2020 | Nasimuddin | H02J 50/27 |
| 2024/0213648 | A1 | 6/2024 | Yoshikawa | |

FOREIGN PATENT DOCUMENTS

| | | | |
|---|---|---|---|
| KR | 200354132 | Y1 | 6/2004 |
| KR | 10-0851075 | B1 | 8/2008 |
| KR | 1020090029573 | A | 3/2009 |

OTHER PUBLICATIONS

Kaouach, H. et al., "Design and demonstration of an X-band transmit-array", https://ieeecplore.ieee.org/stampPDF.jsp; Mar. 23, 2009, 5 pp.

Xie, Peng et al., "Circularly Polarized Fabry-Perot Antenna Employing a Receiver-Transmitter Polarization Conversion Metasurface", IEEE Transactions On Antennas and Propagation, IEEE, USA, vol. 68, No. 4, Nov. 6, 2019, 6 pp.

* cited by examiner

COMPOSITE RESONATOR AND ASSEMBLY

CROSS-REFERENCE TO RELATED APPLICATIONS

This application is national stage application of International Application No. PCT/JP2021/046887, filed on Dec. 17, 2021, which claims priority to Japanese Patent Application No. 2021-070368, filed on Apr. 19, 2021.

TECHNICAL FIELD

The present disclosure relates to a composite resonator and an assembly.

BACKGROUND OF INVENTION

A known technique involves controlling electromagnetic waves without using a dielectric lens. For example, Patent Document 1 describes a technique of changing the polarization of radio waves by changing parameters of respective elements in a structure including an array of resonator elements.

CITATION LIST

Patent Literature

Patent Document 1: JP 2003-526978 T

SUMMARY

Summary of the Invention

In the resonator element described in Patent Document 1, polarization is changed when reflected, and there is no description about transmission.

An objective of the present disclosure is to provide a composite resonator and an assembly that can be made with a high degree of design freedom.

Solution to Problem

A composite resonator according the present disclosure includes a first resonator extending in a first plane direction, a second resonator spaced apart from the first resonator in a first direction and extending in the first plane direction, a third resonator located between the first resonator and the second resonator in the first direction and configured to be magnetically or capacitively connected to or electrically connected to each of the first resonator and the second resonator, and a reference conductor extending in the first plane direction, located between the first resonator and the second resonator in the first direction and serving as a potential reference of the first resonator and the second resonator, in which the third resonator directly connects the first resonator and the second resonator to each other and is not in contact with the reference conductor, and the first resonator and the second resonator are arranged with a center of the first resonator and a center of the second resonator being shifted from each other in the first direction.

An assembly according to the present disclosure includes a plurality of the composite resonators according to the present disclosure, in which the plurality of composite resonators are arranged in the first plane direction.

Advantageous Effect

According to the present disclosure, a composite resonator and an assembly that can be made with a high degree of design freedom can be provided.

DESCRIPTION OF EMBODIMENTS

Embodiments of the present disclosure will be described in detail with reference to the drawings. The embodiments described below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis orthogonal to the X-axis in the horizontal plane is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

Overview

Figure 1:
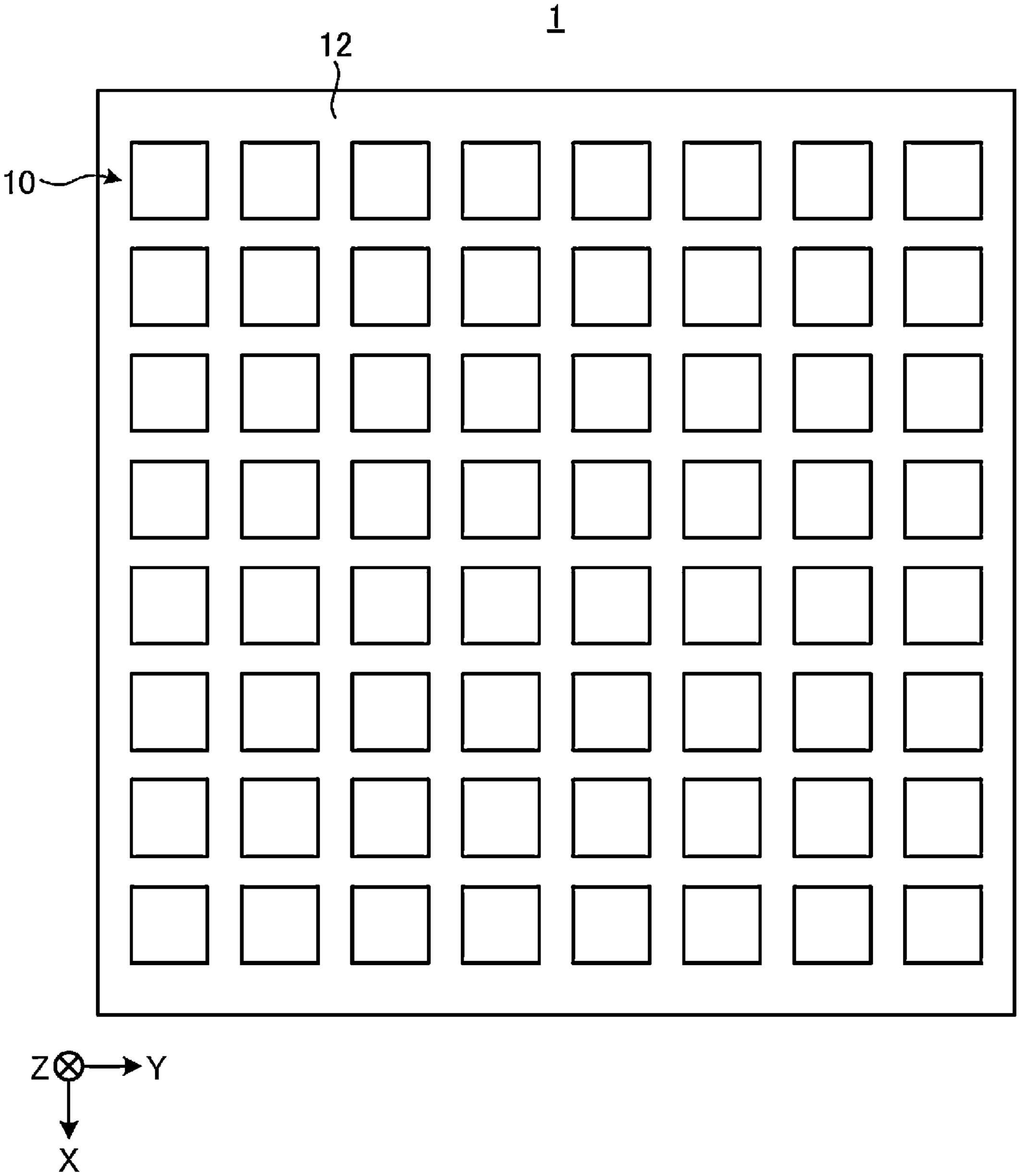
FIG. 1 is a diagram illustrating an overview of a radio wave refracting plate according to each embodiment.

FIG. 1 illustrates an assembly in which a plurality of composite resonators are periodically arranged. In the assembly, the plurality of composite resonators periodically arranged function as an assembly.

As illustrated in FIG. 1, an assembly 1 includes a plurality of unit structures 10 and a substrate 12.

The plurality of unit structures 10 are arranged in an XY plane direction. The XY plane direction may also be referred to as a first plane direction. That is, the plurality of unit structures 10 are arranged two-dimensionally. Each of the plurality of unit structures 10 has a resonance structure. The structure of the unit structure 10 will be described later. The unit structure 10 may be referred to as a composite resonator. The substrate 12 may be, for example, a dielectric substrate made of a dielectric body. The assembly 1 is made by two-dimensionally arranging the plurality of unit structures 10 having the resonance structure on the substrate 12 made of the dielectric body.

In the present disclosure, the assembly can be made by arranging the composite resonators of the following embodiments as illustrated in FIG. 1.

First Embodiment

Configuration of Unit Structure

Figure 2:
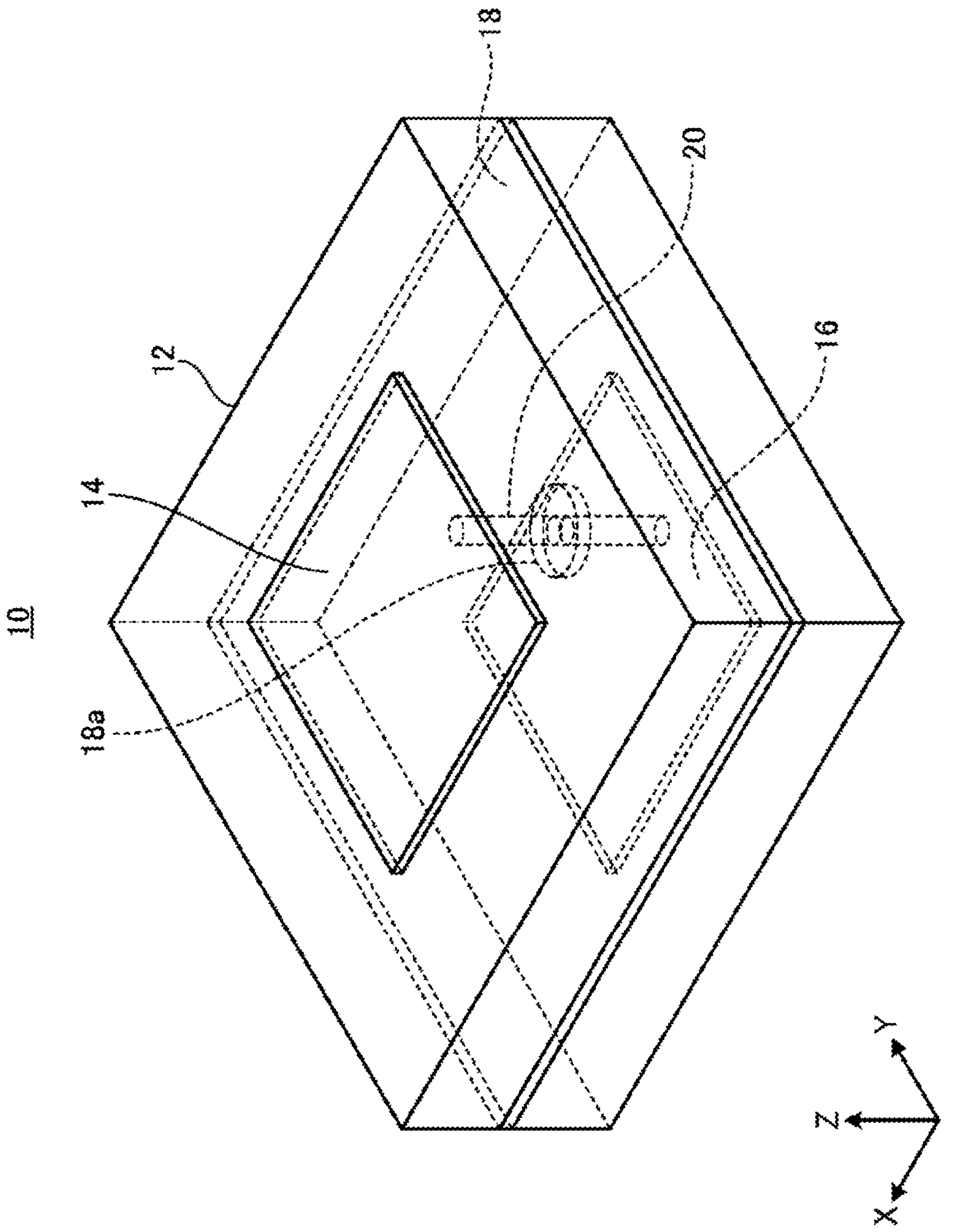
FIG. 2 is a diagram schematically illustrating a configuration example of a unit structure according to a first embodiment.

A configuration example of the unit structure according to a first embodiment will be described with reference to FIG. 2. FIG. 2 is a diagram schematically illustrating the configuration example of the unit structure according to the first embodiment. In this structure, a horizontally polarized wave is radiated as a horizontally polarized wave.

The first resonator 14 may be arranged on the substrate 12, extending on the XY plane. The first resonator 14 may be made of a conductor. The first resonator 14 may be, for example, a patch conductor formed in a rectangular shape. In the example illustrated in FIG. 2, the first resonator 14 is illustrated as the rectangular patch conductor, but the present disclosure is not limited thereto. The first resonator 14 may have, for example, a linear shape, a circular shape, a loop shape, or a polygonal shape other than a rectangular shape. That is, the shape of the first resonator 14 may be arbitrarily changed according to the design. The first resonator 14 resonates by an electromagnetic wave received from the +Z-axis direction.

The first resonator 14 radiates an electromagnetic wave during resonance. The first resonator 14 radiates the electromagnetic wave to the +Z-axis direction side during resonance.

The second resonator 16 may be arranged on the substrate 12 to extend on the XY plane at a position away from the first resonator 14 in the Z-axis direction. The second resonator 16 may be, for example, a patch conductor formed in a rectangular shape. In the example illustrated in FIG. 2, the second resonator 16 is illustrated as the rectangular patch conductor, but the present disclosure is not limited thereto. The second resonator 16 may have, for example, a linear shape, a circular shape, a loop shape, or a polygonal shape other than a rectangular shape. That is, the shape of the second resonator 16 may be arbitrarily changed according to the design. The shape of the second resonator 16 may be the same as or different from the shape of the first resonator 14. The area of the second resonator 16 may be the same as or different from the area of the first resonator 14.

The second resonator 16 radiates an electromagnetic wave during resonance. The second resonator 16, for example, radiates the electromagnetic wave to the −Z-axis direction side. The second resonator 16 radiates the electromagnetic wave to the −Z-axis direction side during resonance. The second resonator 16 resonates by receiving the electromagnetic wave from the −Z-axis direction.

The second resonator 16 may resonate at a phase different from that of the first resonator 14. The second resonator 16 may resonate in a direction different from the first resonator 14 in the XY plane direction. For example, when the first resonator 14 resonates in the X-axis direction, the second resonator 16 may resonate in the Y-axis direction. The resonance direction of the second resonator 16 may change with time in the XY plane direction corresponding to a change with time in the resonance direction of the first resonator 14. The second resonator 16 may radiate the electromagnetic wave received by the first resonator 14 with a first frequency band thereof attenuated.

The reference conductor 18 may be arranged between the first resonator 14 and the second resonator 16 in the substrate 12. The reference conductor 18 may be, for example, at the center between the first resonator 14 and the second resonator 16 in the substrate 12, but the present disclosure is not limited thereto. For example, the reference conductor 18 may be at a position where the distance from the reference conductor 18 to the first resonator 14 differs from the distance from the reference conductor 18 to the second resonator 16. The reference conductor 18 has a through-hole 18*a* through which the connection line path 20 extends. The reference conductor 18 surrounds at least a part of the connection line path 20.

The connection line path 20 may be made of a conductor. The connection line path 20 is located between the first resonator 14 and the second resonator 16 in the Z-axis direction. The Z-axis direction may also be referred to as a first direction, for example. The connection line path 20 may be connected to each of the first resonator 14 and the second resonator 16. Although the connection line path 20 passes through the through-hole 18*a*, the connection line path 20 is not in contact with the reference conductor 18. The connection line path 20 may be magnetically or capacitively connected to each of the first resonator 14 and the second resonator 16, for example. For example, the connection line path 20 may be electrically connected to each of the first resonator 14 and the second resonator 16. The connection line path 20 is connected to a side of the first resonator 14 parallel to the X-axis direction and is connected to a side of the second resonator 16 parallel to the X-axis direction. The connection line path 20 may be a path parallel to the Z-axis direction. The connection line path 20 may be a third resonator.

The unit structure 10 magnetically or capacitively connects the first resonator 14 and the second resonator 16 or electrically connects them to be combined. By combining the three resonators, the unit structure 10 transmits a high frequency excited by an electromagnetic wave incident on the first resonator 14 through the composite resonator. The unit structure 10 may have any one or more functions of a phase shift, a band-pass filter, a high-pass filter, and a low-pass filter depending on the transmission characteristics of the unit structure.

The unit structure 10 changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

As illustrated in FIG. 2, in the unit structure 10, the first resonator 14 disposed on an upper surface of the substrate 12 and the second resonator 16 disposed on a lower surface of the substrate 12 are arranged to be shifted from a state of being opposed to each other. Specifically, the second resonator 16 is arranged with the center of the lower surface of the substrate 12 and the center of the second resonator 16 being shifted from each other. The first resonator 14 and the second resonator 16 are arranged and radiate an electromagnetic wave incident on the first resonator 14 from the X-axis direction from the second resonator 16 in a direction parallel to the Y-axis direction. That is, the unit structure 10 converts the electromagnetic wave in the vertical direction into the electromagnetic wave in the horizontal direction. In other words, the second resonator 16 resonates in an in-plane direction different from the first resonator 14 in the XY plane direction. The connection line path 20 is connected to sides of the first resonator 14 and the second resonator 16, the sides being parallel to the Y-axis direction.

Figure 3:
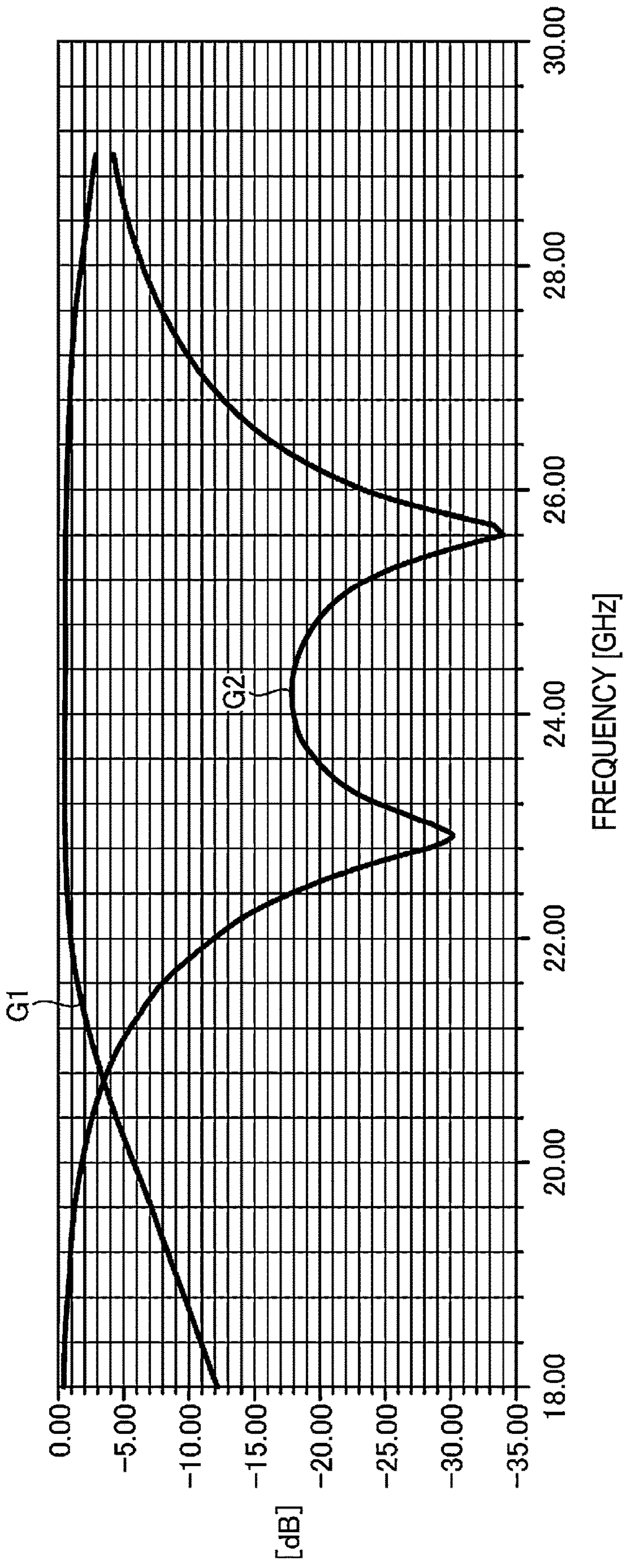
FIG. 3 is a graph showing frequency characteristics of the unit structure according to the first embodiment.
Figure 4:
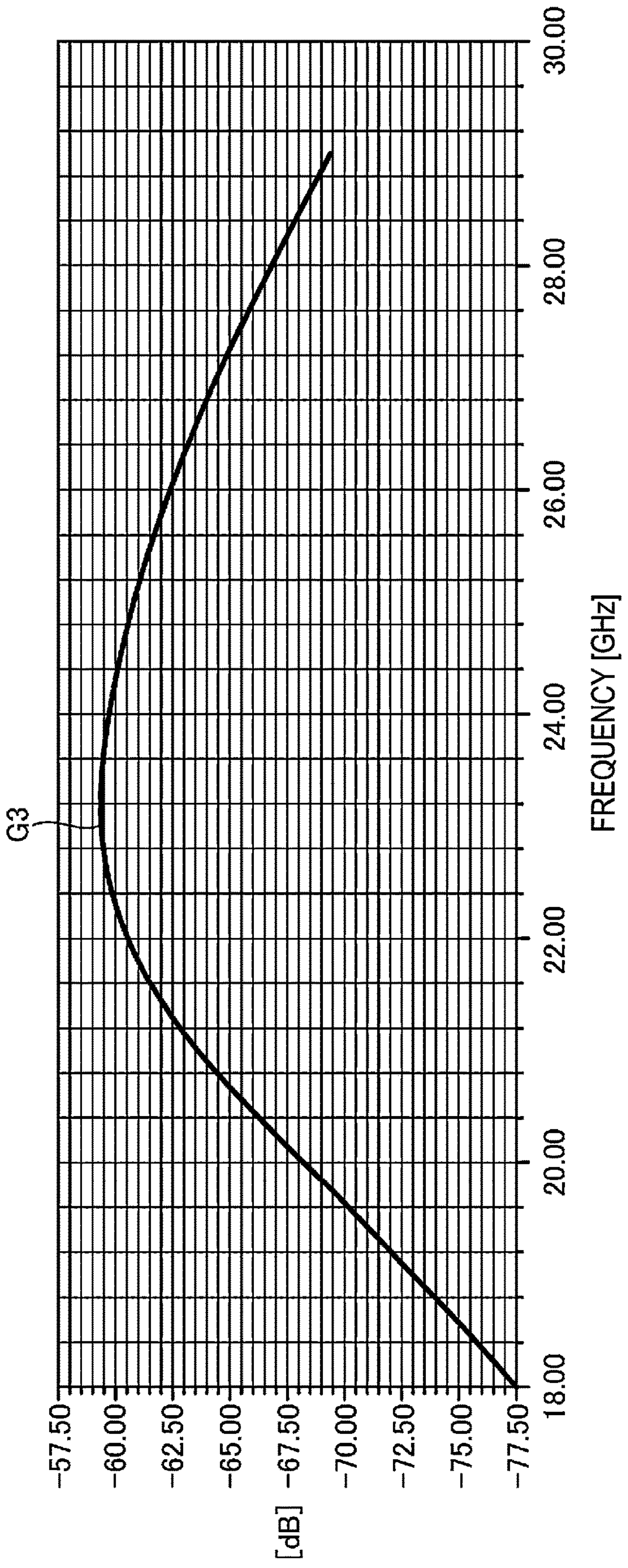
FIG. 4 is a graph showing frequency characteristics of the unit structure according to the first embodiment.

Frequency characteristics of the unit structure according to the first embodiment will be described with reference to FIGS. 3 and 4. FIGS. 3 and 4 are graphs showing the frequency characteristics of the unit structure according to the first embodiment.

In FIG. 3, the horizontal axis represents the frequency [Giga Hertz (GHz)] and the vertical axis represents the gain [deci Bel (dB)]. FIG. 3 shows a graph G1 and a graph G2. The graph G1 shows a transmission coefficient when the electromagnetic wave incident from the X-axis direction is radiated in the X-axis direction. The graph G2 shows a reflection coefficient. The graph G1 shows that the insertion loss in a region from around 21.00 GHz to around 28.00 GHz is about −3 dB or more and transmission characteristics are satisfactory. The graph G2 shows that the reflection coefficient in the region from around 21.00 GHz to around 28.00 GHz is low. That is, the unit structure 10 illustrated in FIG. 2 has satisfactory transmission characteristics over a wide range from around 21.00 GHz to around 28.00 GHz. That is, the unit structure 10 can be used as a spatial filter that changes the phase of the electromagnetic wave.

In FIG. 4, the horizontal axis represents the frequency [GHz] and the vertical axis represents the gain [dB]. FIG. 4 shows a graph G3. The graph G3 shows a transmission coefficient when an electromagnetic wave incident from the X-axis direction is radiated in the Y-axis direction. As shown in the graph G3, the transmission coefficient when the electromagnetic wave incident from the X-axis direction is radiated in the X-axis direction is −60 dB at maximum. That is, the unit structure 10 does not to radiate an electromagnetic wave incident on the first resonator 14 from the X-axis direction from the X-axis direction of the second resonator 16.

Second Embodiment

Configuration of Unit Structure

Figure 5:
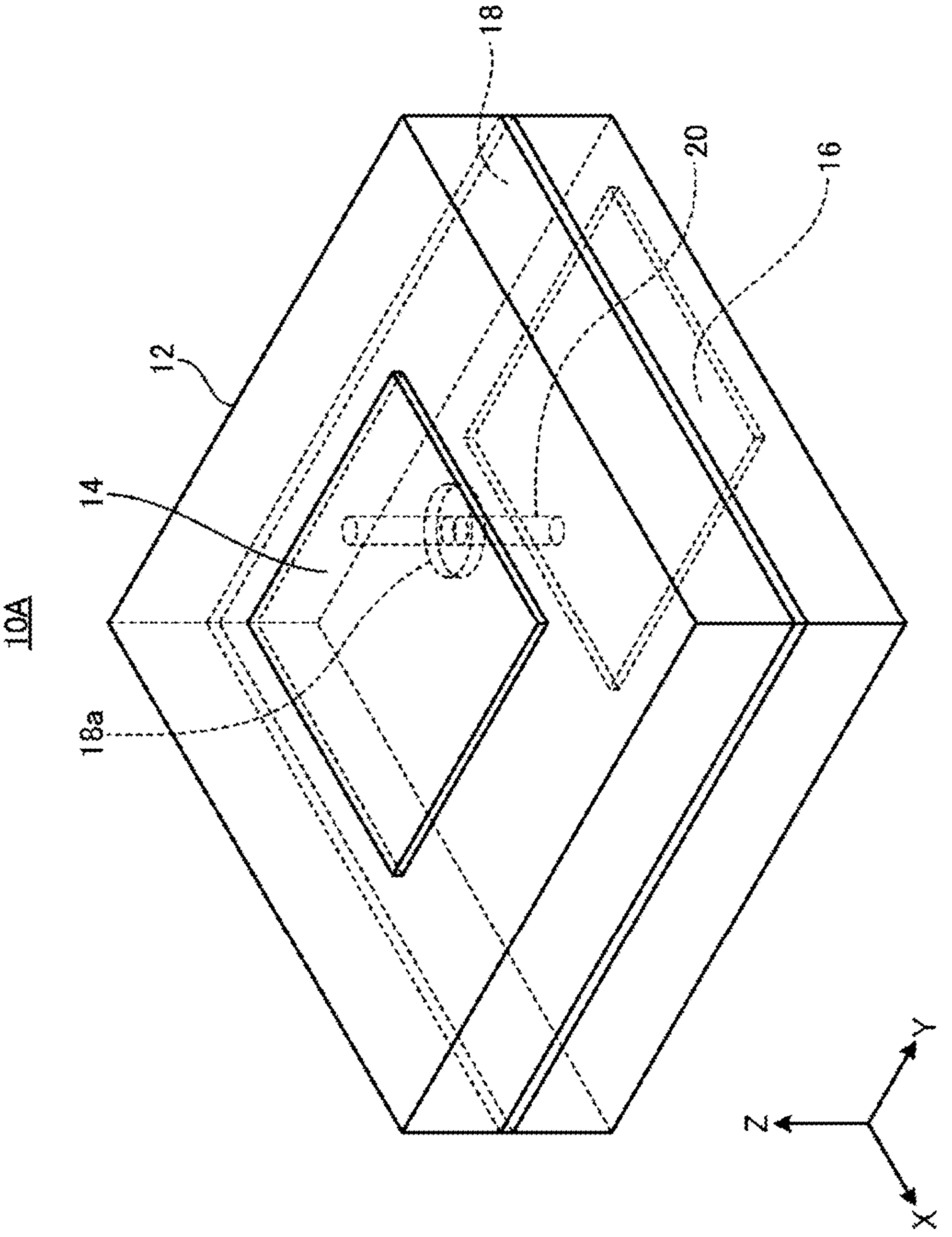
FIG. 5 is a diagram schematically illustrating a configuration example of the unit structure according to the first embodiment.

A configuration example of a unit structure according to a second embodiment will be described with reference to FIG. 5. FIG. 5 is a diagram schematically illustrating the configuration example of the unit structure according to the second embodiment. In this structure, a horizontally polarized wave is radiated as a vertically polarized wave.

As illustrated in FIG. 5, in the unit structure 10A, the first resonator 14 disposed on an upper surface of the substrate 12 and the second resonator 16 disposed on a lower surface of the substrate 12 are arranged to be shifted from a state of being opposed to each other. Specifically, the second resonator 16 is arranged in a state of being shifted in the Y-axis direction with the center of the lower surface of the substrate 12 and the center of the second resonator 16 being shifted from each other. The first resonator 14 and the second resonator 16 are arranged and radiate the electromagnetic wave incident on the first resonator 14 from the X-axis direction from the second resonator 16 as a circularly polarized wave. In the second embodiment, the connection line path 20 is connected to a side of the first resonator 14, the side being parallel to the Y-axis direction, and is connected to a side of the second resonator 16, the side being parallel to the X-axis direction.

Figure 6:
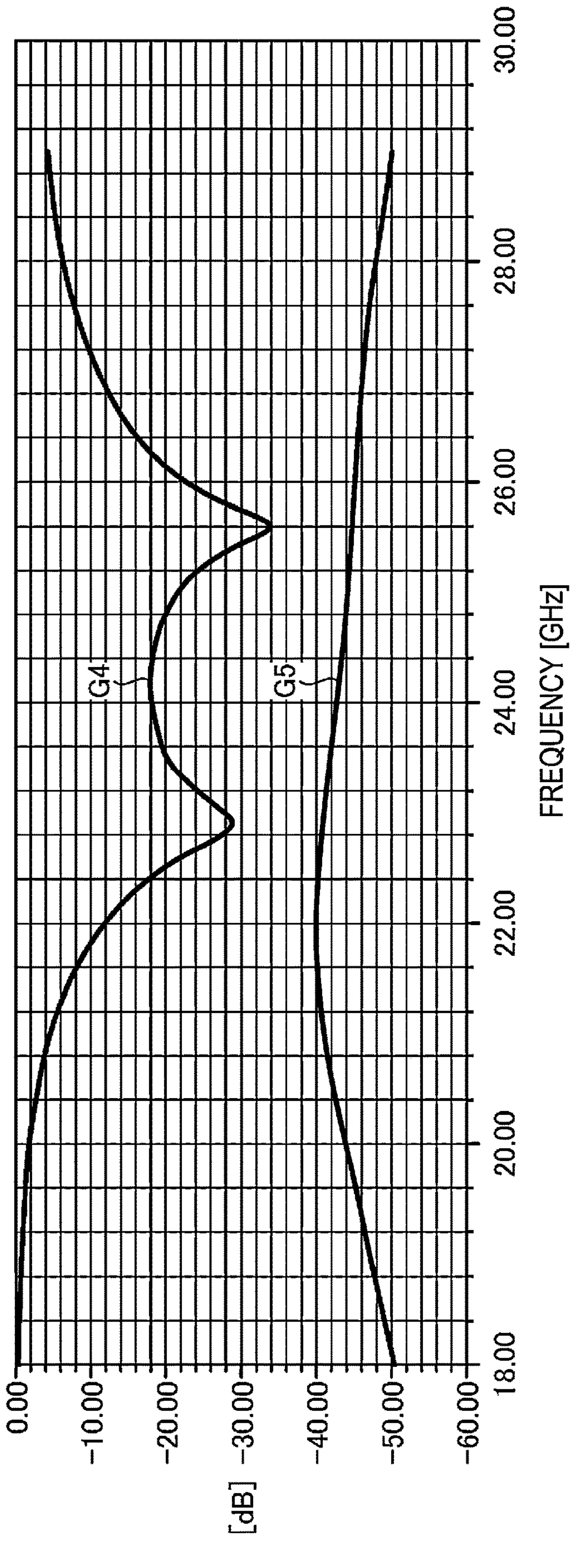
FIG. 6 is a graph showing frequency characteristics of a unit structure according to a second embodiment.
Figure 7:
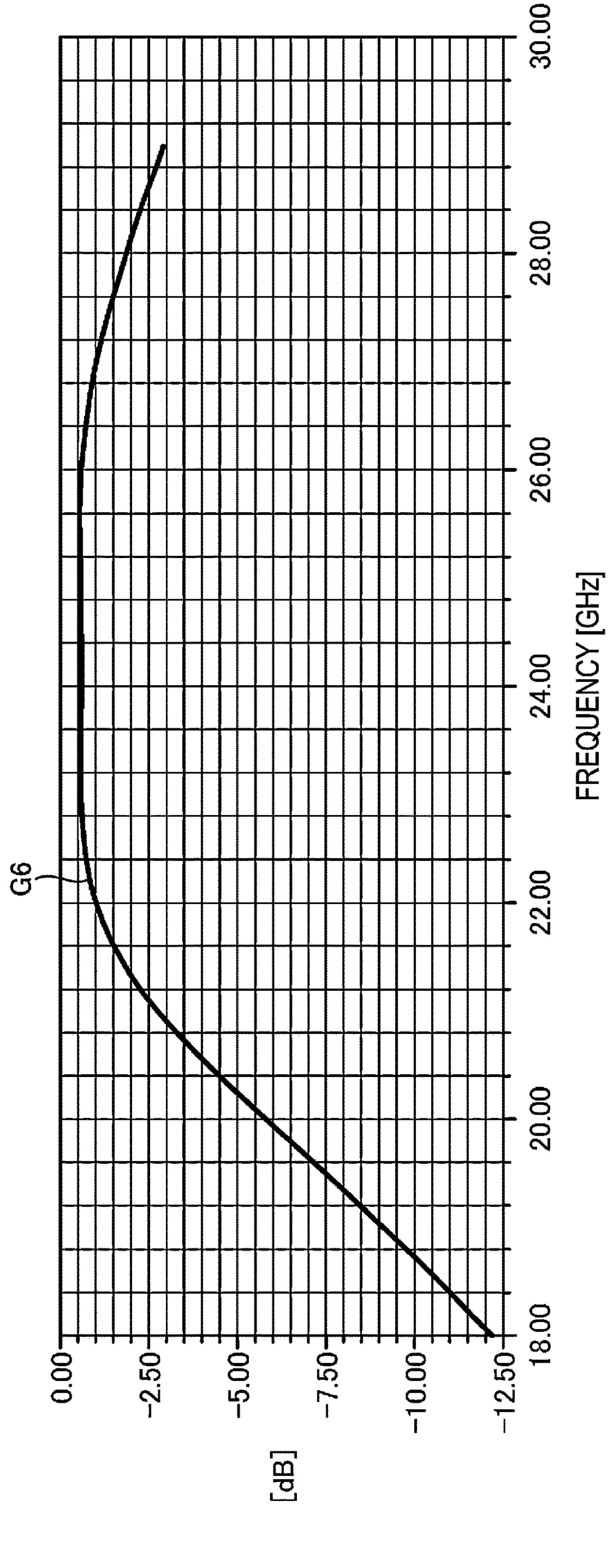
FIG. 7 is a graph showing frequency characteristics of the unit structure according to the second embodiment.

Frequency characteristics of the unit structure according to the second embodiment will be described with reference to FIGS. 6 and 7. FIGS. 6 and 7 are graphs showing the frequency characteristics of the unit structure according to the second embodiment.

In FIG. 6, the horizontal axis represents the frequency [GHz] and the vertical axis represents the gain [dB]. FIG. 6 shows a graph G4 and a graph G5. The graph G4 shows a transmission coefficient when the electromagnetic wave incident from the X-axis direction is radiated in the X-axis direction. The graph G5 shows a reflection coefficient. The graph G5 means that the insertion loss is −40 dB in each frequency band. This indicates that, in the unit structure 10A, the electromagnetic wave incident in the X-axis direction is less likely to be radiated from the X-axis direction. The graph G5 shows that the reflection coefficient is low in each frequency band.

In FIG. 7, the horizontal axis represents the frequency [GHz] and the vertical axis represents the gain [dB]. FIG. 7 shows a graph G6. The graph G6 shows a transmission coefficient when the electromagnetic wave incident from the X-axis direction is radiated in the Y-axis direction. As shown in the graph G6, the insertion loss in a region from around 21.00 GHz to around 29.00 GHz is about −3 dB or more and transmission characteristics are satisfactory. In the unit structure 10A, the connection line path 20 is connected to a side of the first resonator 14, the side being parallel to the Y-axis direction, and is connected to a side of the second resonator 16, the side being parallel to the X-axis direction.

Third Embodiment

Configuration of Unit Structure

Figure 8:
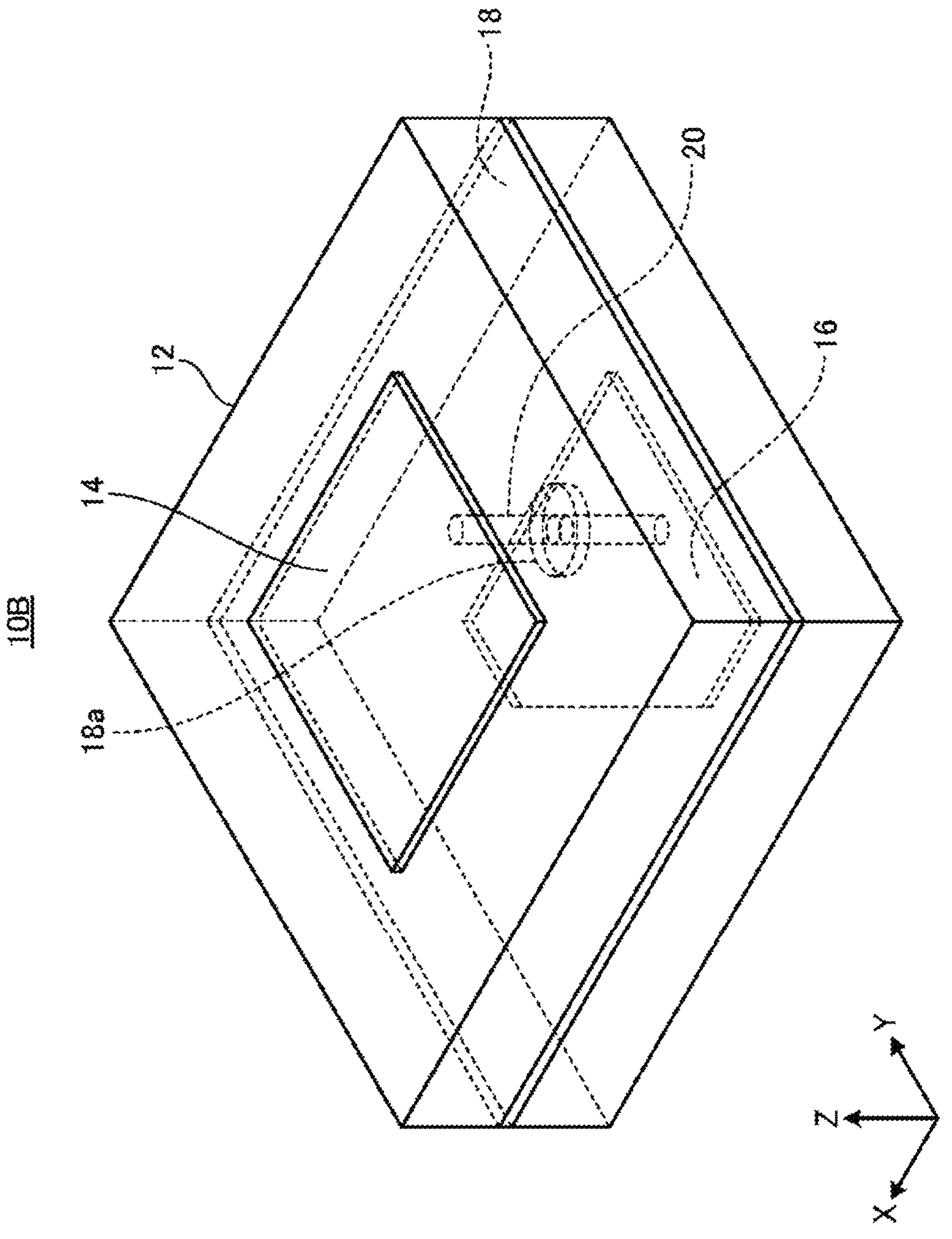
FIG. 8 is a diagram schematically illustrating a configuration example of a unit structure according to a third embodiment.

A configuration example of the unit structure according to a third embodiment will be described with reference to FIG. 8. FIG. 8 is a diagram schematically illustrating the configuration example of the unit structure according to the third embodiment. In this structure, a linearly polarized wave is radiated as the horizontally polarized wave.

As illustrated in FIG. 8, a unit structure 10B is different from the unit structure 10 illustrated in FIG. 2 in that the shape of the second resonator 16 disposed on the lower surface of the substrate 12 is different. Specifically, the second resonator 16 of the unit structure 10B has a shape obtained by cutting off one apex portion of a rectangular resonator. In the third embodiment, the resonance direction of the second resonator 16 changes with time in the XY plane direction with respect to the resonance direction of the first resonator 14.

Figure 9:
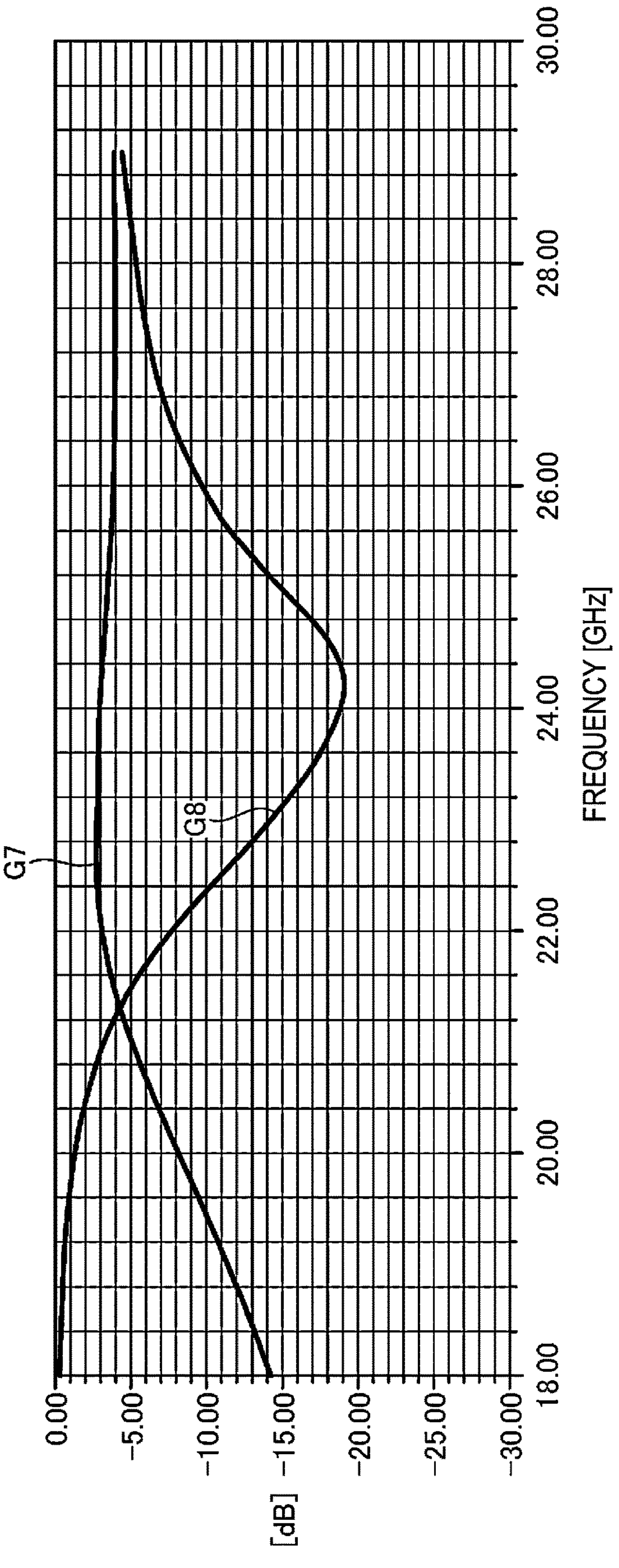
FIG. 9 is a graph showing frequency characteristics of the unit structure according to the third embodiment.
Figure 10:
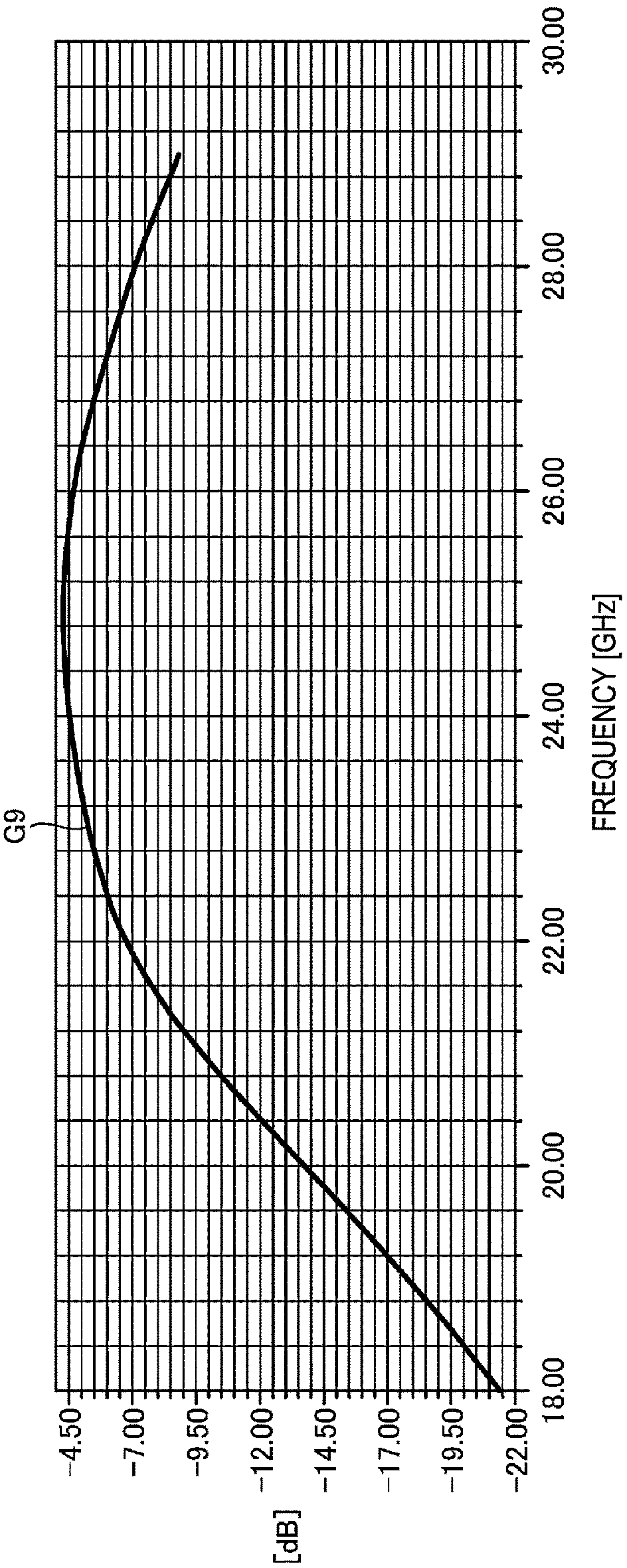
FIG. 10 is a graph showing frequency characteristics of the unit structure according to the third embodiment.

Frequency characteristics of the unit structure according to the third embodiment will be described with reference to FIGS. 9 and 10. FIGS. 9 and 10 are graphs showing frequency characteristics of the unit structure according to the third embodiment.

In FIG. 9, the horizontal axis represents the frequency [GHz] and the vertical axis represents the gain [dB]. FIG. 9 shows a graph G7 and a graph G8. The graph G7 shows a transmission coefficient when the electromagnetic wave incident from the X-axis direction is radiated in the X-axis direction. The graph G8 shows a reflection coefficient. The graph G7 shows that insertion loss in a region from around 21.00 GHz to around 28.00 GHz is about −5 dB or more and transmission characteristics are satisfactory. The graph G8 shows that the reflection coefficient in the region from around 21.00 GHz to around 28.00 GHz is low. That is, the unit structure 10B illustrated in FIG. 8 has satisfactory transmission characteristics over a wide range from around 21.00 GHz to around 28.00 GHz.

In FIG. 10, the horizontal axis represents the frequency [GHz] and the vertical axis represents the gain [dB]. FIG. 10 shows a graph G9. The graph G9 shows a transmission coefficient when the electromagnetic wave incident from the X-axis direction is radiated in the Y-axis direction. As shown in the graph G9, in the transmission coefficient when the electromagnetic wave incident from the X-axis direction is radiated in the Y-axis direction, the insertion loss in a region from around 21.00 GHz to around 28.00 GHz is about −5 dB or more and transmission characteristics are satisfactory.

The unit structure 10B radiates the electromagnetic wave incident on the first resonator 14 from the X-axis direction from the X-axis direction and the Y-axis direction of the second resonator 16. That is, a unit structure 10D radiates the electromagnetic wave incident from the X-axis direction as the circularly polarized wave.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

The invention claimed is:

1. A composite resonator comprising:

a first resonator extending in a first plane direction;

a second resonator spaced apart from the first resonator in a first direction and extending in the first plane direction;

a third resonator located between the first resonator and the second resonator in the first direction and configured to be magnetically or capacitively connected to or electrically connected to each of the first resonator and the second resonator; and a reference conductor extending in the first plane direction, located between the first resonator and the second resonator in the first direction and serving as a potential reference of the first resonator and the second resonator, wherein the third resonator is not in contact with the reference conductor, the first resonator and the second resonator each have a rectangular shape, and the second resonator has a structure obtained by cutting off at least one apex portion.

2. The composite resonator according to claim 1, wherein the third resonator is connected to a side of the first resonator parallel to a second direction in the first plane direction, and is connected to a side of the second resonator parallel to a third direction different from the second direction in the first plane direction.

3. The composite resonator according to claim 1, wherein the first resonator is configured to resonate by receiving an electromagnetic wave from a forward direction of the first direction.

4. The composite resonator according to claim 1, wherein the second resonator is configured to radiate an electromagnetic wave during resonance.

5. The composite resonator according to claim 1, wherein the second resonator is configured to radiate an electromagnetic wave in a reverse direction of the first direction during resonance.

6. The composite resonator according to claim 1, wherein the second resonator is configured to resonate by receiving an electromagnetic wave from the reverse direction of the first direction.

7. The composite resonator according to claim 1, wherein the first resonator is configured to radiate an electromagnetic wave during resonance.

8. The composite resonator according to claim 7, wherein the first resonator is configured to radiate the electromagnetic wave in a forward direction of the first direction during resonance.

9. The composite resonator according to claim 6, wherein the second resonator is configured to resonate at a phase different from a phase of the first resonator.

10. The composite resonator according to claim 6, wherein the second resonator is configured to resonate in an in-plane direction different from an in-plane direction of the first resonator in the first direction.

11. The composite resonator according to claim 6, wherein the resonance direction of the second resonator is configured to change with time in the first plane direction with respect to the resonance direction of the first resonator.

12. The composite resonator according to claim 6, wherein the second resonator is configured to radiate the electromagnetic wave received by the first resonator with a first frequency band being attenuated.

13. An assembly comprising:

a plurality of the composite resonators according to claim 1, wherein the plurality of composite resonators are arranged in the first plane direction.

14. A composite resonator comprising:

a first resonator extending in a first plane direction;

a second resonator spaced apart from the first resonator in a first direction and extending in the first plane direction, wherein the second resonator is configured to resonate by receiving an electromagnetic wave from a reverse direction of the first direction;

a third resonator between the first resonator and the second resonator in the first direction and configured to be magnetically, capacitively or electrically connected to each of the first resonator and the second resonator; and a reference conductor extending in the first plane direction, wherein the reference conductor is between the first resonator and the second resonator in the first direction and serves as a potential reference of the first resonator and the second resonator, wherein the third resonator is spaced from the reference conductor, and a resonance direction of the second resonator is configured to change with time in the first plane direction with respect to a resonance direction of the first resonator.

15. A composite resonator comprising:

a first resonator extending in a first plane direction;

a second resonator spaced apart from the first resonator in a first direction and extending in the first plane direction, wherein the second resonator is configured to resonate by receiving an electromagnetic wave from a reverse direction of the first direction;

a third resonator between the first resonator and the second resonator in the first direction and configured to be magnetically, capacitively or electrically connected to each of the first resonator and the second resonator; and a reference conductor extending in the first plane direction, wherein the reference conductor is between the first resonator and the second resonator in the first direction and serves as a potential reference of the first resonator and the second resonator, wherein the third resonator is spaced from the reference conductor, and the second resonator is configured to radiate the electromagnetic wave received by the first resonator with a first frequency band being attenuated.

* * * * *